United States Patent [19]

Kricheldorf et al.

[11] Patent Number: 4,631,333
[45] Date of Patent: Dec. 23, 1986

[54] PROCESS FOR THE PREPARATION OF POLYIMIDE ESTERS OF TRIMELLITIC ACID

[75] Inventors: Hans R. Kricheldorf; Ralf Pakull, both of Hamburg; Hans-Rudolf Dicke, Krefeld, all of Fed. Rep. of Germany

[73] Assignee: Bayer Aktiengesellschaft, Leverkusen, Fed. Rep. of Germany

[21] Appl. No.: 760,461

[22] Filed: Jul. 30, 1985

[30] Foreign Application Priority Data

Aug. 11, 1984 [DE] Fed. Rep. of Germany ....... 3429680
Feb. 9, 1985 [DE] Fed. Rep. of Germany ....... 3504481

[51] Int. Cl.[4] ............................................. C08G 73/16
[52] U.S. Cl. .................... 528/170; 528/208; 528/322
[58] Field of Search ................. 528/170, 208, 322

[56] References Cited

U.S. PATENT DOCUMENTS

| | | | |
|---|---|---|---|
| 3,542,731 | 11/1970 | Culbertson | 528/170 |
| 3,567,685 | 3/1971 | Bialous et al. | 528/170 |
| 4,176,223 | 11/1979 | Irwin | 528/170 |
| 4,245,086 | 1/1981 | Uno et al. | 528/170 |
| 4,297,474 | 10/1981 | Williams, III et al. | 528/170 |

FOREIGN PATENT DOCUMENTS 8067725  4/1983  Japan .................... 528/170

*Primary Examiner*—John Kight
*Assistant Examiner*—M. L. Moore
*Attorney, Agent, or Firm*—Connolly and Hutz

[57] ABSTRACT

This invention relates to a process for the preparation of polyimide esters starting from trimellitic acid anhydride and aminophenols or aminohydroxy biphenyls.

4 Claims, No Drawings

PROCESS FOR THE PREPARATION OF POLYIMIDE ESTERS OF TRIMELLITIC ACID

This invention relates to a process for the preparation of polyimide esters starting from trimellitic acid anhydride and aminophenols or aminohydroxy biphenyls.

Polyimide esters are known. U.S. Pat. Nos. 3,542,731 and 4,383,105 and Makromol Chem. 184 pages 1233-1229 (1983), for example, describe processes in which the monomeric trimellitic acid imide is first prepared from trimellitic acid anhydride and aminophenol (esters) and is then polymerised solvent free under conditions of pyrolysis. These methods have, however, the disadvantage that polymerisation may also give rise to products which may adversely affect the properties of the resulting polymers.

It has now been found that trimellitic acid polyimide esters which do not have these disadvantages may be obtained by carrying out polymerisation in a solvent in the presence of a dehydrating agent.

The object of this invention is therefore a process for the preparation of homo and copolyesters of N-(hydroxy aryl) trimellitic acid imides, characterised in that trimellitic acid anhydride and an aminophenol are reacted in a solvent to form the corresponding trimellitic amide acid which is then cyclised and polycondensed after the addition of a high boiling reaction medium with a dehydrating agent, optionally in the presence of other comonomers.

The amino phenols used in the process according to the invention may be p-aminophenols corresponding to formula (1)

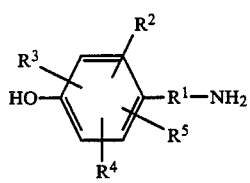

wherein $R^1$ is a single bond or an arylene group with 6 to 10 carbon atoms optionally substituted 1 to 3 times with halogen atoms such as chlorine or bromine or with an alkyl group containing 1 to 3 carbon atoms, and $R^2$, $R^3$, $R^4$, $R^5$ represent independently hydrogen, alkyl groups having 1 to 3 carbon atoms or halogen such as chlorine or bromine, or p-aminophenols corresponding to formula (2)

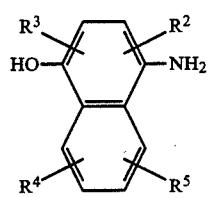

or formula (3)

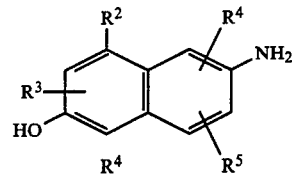

wherein $R^2$, $R^3$, $R^4$, $R^5$ have the meanings indicated for formula (1).

The following are examples of suitable aminophenols of formula (1), (2) or (3):

4-aminophenol, 4-amino-2-methylphenol, 4-amino-3-methyl phenol, 4-amino-2,3-dimethyl phenol, 4-amino-2,5-dimethyl phenol, 4-amino-2,6-dimethyl phenol, 4-amino-2-chlorophenol, 4-amino-2,6-dichlorophenol, 4-amino-3,5-dichlorophenol 4-amino-4-hydroxybiphenyl, 4-amino-1-hydroxy naphthalene, 2-amino-6-hydroxy naphthalene, 4-amino-2,3-dimethyl-1-hydroxy naphthalene, 4-amino-2,3-dichloro-1-hydroxy naphthalene.

The following are suitable solvents for the reaction of trimellitic acid anhydride to form the amide acid: Cyclic ethers such as tetrahydrofuran or dioxane, the latter being preferred; acid amides, e.g. dialkyl carbonamides such as dimethyl formamide or dimethyl acetamide; lactones such as butyrolactone, linear ethers such as 1,2-ethanediol-dimethyl ether, linear esters such as pivalic acid methyl ester, nitriles such as pivalonitrile, butyric acid nitrile, polar aromatic compounds such as chlorobenzene, and benzonitrile (also as mixtures with pyridine).

The solvents may be used singly or as mixtures.

The dehydrating agents used for the cyclisation and dehydration may be carboxylic acid anhydrides such as acetic anhydride, carboxylic acid chlorides such as acetyl chloride, aromatic chloroformic acid esters such as chloroformic acid phenyl ether, carbonates such as diphenyl carbonate, phosphites such as triphenyl phosphite, imidazole derivatives such as carbonyl diimidazole and imidazolides of phosphorous acid. Any aliphatic anhydrides of acids boiling below 200° C. may also be used, e.g. anhydrides of propionic acid, butyric acid or hexanoic acid or mixed anhydrides such as formic acid-acetic acid anhydride, or any carboxylic acid chlorides of acids boiling below 200° C., e.g. pivalic acid chloride or chloroformic acid alkyl esters.

Acetic anhydride, acetyl chloride and chloroformic acid phenyl ester are preferably used.

The high boiling reaction medium for the cyclisation and dehydration may suitably be a polyphenyl compound, e.g. a terphenyl, a benzylated benzene such as a mixture of isomeric dibenzyl and tribenzyl benzenes (Marlotherm-S ®), sulphones such as diphenyl sulphone, substituted diphenyl ethers such as 4,4'-dichlorodiphenyl ether, 2-phenyl naphthalene, and 4,4'-dichlorodiphenyl methane.

The comonomers optionally used in the process according to the invention may be substituted or unsubstituted 4-hydroxy benzoic acids, p-dihydroxy benzene, 4,4'-dihydroxy biphenyl or 2,6-dihydroxy napthalene or mixtures thereof, or dicarboxylic acids such as terephthalic acid, 2,6-naphthalene dicarboxylic acid or 1,4-cyclohexane dicarboxylic acid or mixtures thereof The bis-hydroxy compounds and dicarboxylic acids are generally used in an approximately equimolar ratio of from 0.9:1 to 1:0.9.

In the process according to the invention, the reaction of the trimellitic acid anhydride with the p-aminophenol of formula (1), (2) or (3) to form the amide acid may be carried out in a solvent at a temperature of from 40° C. to 150° C., preferably from 60° C. to 100° C.

For the cyclisation and dehydration of the amide acid in high boiling solvents, optionally in the presence of other comonomers, the reaction mixture is heated to temperatures of 200° C. to 400° C., preferably 240° C. to 380° C., most preferably 340° C. to 360° C. For this reaction, heating is advantageously carried out in an inert gas atmosphere (e.g. nitrogen, argon). The application of a slight excess pressure of up to 5 bar may be advantageous in special cases.

To carry out the process according to the invention, trimellitic acid anhydride and the p-amino-phenol of formula (1) are introduced into the reaction vessel in a solvent and a catalyst conventionally used for this reaction is added in the usual quantities, and the mixture is then stirred for 10 to 60 minutes at a temperature of 60° C. to 120° C. The dehydrating agent is then added and stirring is continued for a further 10 to 60 minutes at a temperature of 60° C. to 120° C. After addition of the high boiling solvent, the temperature is raised to 200° C.–400° C. under a stream of inert gas within about one hour. Under these conditions, the lower boiling components distil off into the stream of inert gas. This temperature is then maintained for a period of 10 to 20 hours under the inert gas atmosphere. After cooling to room temperature, the polymer may be isolated in a usual manner, for example by addition of a diluent such as acetone.

The addition of comonomers, e.g. p-hydroxy benzoic acid, may be carried out either before or after cyclisation to the amide acid but is preferably carried out after formation of the amide acid.

The dehydrating agent is generally added in an equimolar quantity for each mol of additional OH and COOH groups derived from the added comonomer.

After filtration and washing with hot diluent (e.g. acetone), the polymer may be dried (e.g. at 100° C./12 mbar).

The process according to the invention is advantageously distinguished from the known processes by the following features:

(a) A one-pot process may be employed, thereby eliminating the need for elaborate methods of isolation and purification of monomeric intermediate stages such as hydroxy phenylamide acid, hydroxy phenylimide acid or acetoxy phenylimide acid, (b) a large number of dehydrating (condensing) agents may be used, and (c) comonomers may be present during the polycondensation.

Temperatures above 300° C., preferably from 340° C. to 360° C., are advantageous for obtaining high molecular weight polyesters (e.g. $\overline{DP} > 50$, $\overline{Mn} > 15,000$) (see table 1).

According to one particular variation of the process, oligoesters are first prepared by the aforesaid one-pot process at a low temperature (250°–300° C.) and these are then further condensed in the solid phase at 340°–360° C. after removal by distillation of a reaction medium boiling at or below 300° C. (e.g. chloronaphthalene), and the end product may be obtained directly as a dry, crystalline powder.

The polymers prepared according to the invention are also advantageously suitable for use in fields where, for example, poly (4-hydroxybenzoates) could previously be used. The polymer is advantageously suitable for the formation of plasma spray coatings and for the production of heat stable, three dimensional articles which are subjected to heavy wear in use, either by moulding in a press or by injection moulding.

Representative injection moulded articles may be produced by compressing the finely powdered polymer powder under a pressure of 70 to 210 bar at a temperature of 340°–440° C. Many other sintering techniques may equally well be employed for producing hard-wearing articles from the polymers prepared according to the invention.

Fillers and/or reinforcing agents may, if desired, be added to the polymers prepared according to the invention in quantities of from 1 to 60% by weight of the resulting mixture.

Suitable substances used as fillers and reinforcing agents include, for example; fibres made of glass, asbestos, graphite carbon, amorphous carbon, synthetic polymers, aluminium, aluminium silicate, aluminium oxide, titanium, magnesium, rock wool, steel, tungsten, cotton and wood cellulose. The fibres may be pretreated, for example to improve their adhesion to the polymer.

Other examples of suitable fillers include calcium silicates, silica, alumina, talcum, mica (schist), polytetrafluoroethylene, graphite, aluminium oxide trihydrate, sodium aluminium carbonate and barium ferrite.

Dyes and pigments may also be added.

The polymers prepared according to the invention may be alloyed or mixed, for example with polymers such as polytetrafluoroethylene to produce materials which are particularly suitable, for example, for the manufacture of long life carrier bags or holdalls, packaging materials, O-ring seals, compressor ring seals, catch spring locks, piston rings, etc. They may also be combined with aluminium or bronze to produce highly abrasion resistant coverings.

The polymers prepared according to the invention are also suitable for the manufacture of electrical parts and electronic components which are required to withstand high temperatures and loads.

Example 1 (No. 1. Table 2)

19.2 g (0.1 mol) of recrystallized trimellitic acid anhydride are dissolved in 40 ml of anhydrous dimethyl formamide, and a solution of 10.9 g (0.1 mol) of 4-amino phenol and 1.5 ml of pyridine in 40 ml of heated dimethyl formamide is run in at about 80° C. The mixture is stirred for 20 minutes at 80° to 100° C., 25 ml (0.26 mol) of acetic anhydride are then added, and the mixture is stirred for a further 20 minutes at 80° to 100° C. 250 ml of Marlotherm-S are then added to dilute the mixture which is then heated to 350° C. in the course of about 1 hour, acetic acid and dimethyl formamide being driven off in a slow stream of nitrogen in the process. The reaction mixture continues to be stirred for a further 16 hours at 350° C. and is then diluted with acetone after cooling, and the product which crystallizes out is filtered off. The polyester obtained is washed with hot acetone and then dried at 100° C./12 mbar Example 2 (No. 3. Table 2)

19.2 g (0.1 mol) of trimellitic acid anhydride are dissolved in 35 ml of dioxane at 80° C., a suspension of 10.9 g (0.1 mol) of 4-aminophenol in 35 ml of hot dioxane is added and the mixture is heated to reflux for 30 minutes. After the mixture has cooled to about 50° C., 20g (0.25 mol) of acetyl chloride are added and the mixture is again heated to reflux for 30 minutes. The reaction mixture is then diluted with 250 ml of Marlotherm-S and heated to 350° C. within 1 hour, during which HCl, acetic acid and dioxane distil off in a slow stream of nitrogen. After 17 hours at 350° C., the reaction mixture is cooled and diluted with acetone, and the product which crystallizes out is filtered off, washed with acetone and dried at 100° C./12 mbar.

Example 3 (cocondensation)

19.2 g (0.1 mol) of trimellitic acid anhydride are dissolved in 50 ml of anhydrous dioxane at 80°–90° C., a suspension of 10 g (0.1 mol) of 4-aminophenol in 50 ml of hot dioxane and 1 mol of pyridine are added and the mixture is heated to reflux for 30 minutes. 27.6 g of 4-hydroxy benzoic acid (0.2 mol) and 52 ml (0.5 mol) of acetic anhydride are then added and the mixture is heated to boiling for 30 minutes. The mixture is then diluted with 250 ml of Marlotherm-S and heated to 350° C. in the course of 1 hour, during which dioxane and acetic acid are distilled off in a slow stream of nitrogen. After 17 hours at 350° C., the reaction mixture is cooled and diluted with acetone, and the product which crystallizes out is filtered off+washed with acetone and dried at 100° C./12 mbar. Yield: 81%, $\overline{DP}$ 100.

Example 4 (cocondensation)

19.2 g (0.1 mol) of trimellitic acid anhydride are dissolved in 50 ml of hot dioxane. A suspension of 10.9 g (0.1 mol) of 4- aminophenol in 50 ml of hot dioxane is added and the mixture is heated to reflux for 30 minutes after the addition of 1 ml of pyridine. 17.2 g (0.1 mol) of trans-1,4-cyclohexane dicarboxylic acid, 10.9 g (0.1 mol) of hydroquinone and 52 ml (0.5 mol) of acetic anhydride are then added and the resulting mixture is again heated to reflux for 30 minutes. The mixture is then diluted with 250 ml of Marlotherm-S and heated to 350° C. in the course of one hour, during which dioxane and acetic acid are distilled off in a slow stream of nitrogen. After a further 17 hours at 350° C., the reaction mixture is cooled and diluted with acetone and the product which crystallizes out is filtered off, washed with acetone and dried at 100° C./12 mbar. Yield: 86%.

TABLE 1 condensation of N—(4-acetoxyphenyl) trimellitic acid

| No. | Reaction medium | Temperature (°C.) | Time (H) | Yield (%) | $\overline{DP}$ |
|---|---|---|---|---|---|
| 1 | Marlotherm-S | 250 | 18 | 97.7 | 2.7 ± 0.2 |
| 2 | Marlotherm-S | 300 | 18 | 97.7 | 5.5 ± 0.5 |
| 3 | Marlotherm-S | 350 | 18 | 91.0 | 55.0 ± 5.0 |
| 4 | Terphenyl | 300 | 18 | | |
| 5 | Diphenyl | 300 | 18 | 95.8 | 10.0 ± 1.0 |
| 6 | — | 300 | 2 | 92.0 | 2.3 ± 0.2 |
| 7 | —(a) | 375 | 8 | 80.5 | 50.0 ± 5.0 |

(a)the dry oligomer from condensation No. 2 was heated under a light stream of nitrogen.

We claim:

1. Process for the preparation of homo and copolyesters of N-(hydroxyaryl)-trimellitic acid imides which comprises
    (a) reacting trimellitic acid anhydride and an aminophenol in a vessel in a solvent at 40° to 150° C. to produce the corresponding trimellitic acid amide and
    (b) in said vessel the amide is then cyclized and polycondensed with a dehydrating agent at 200° to 400° C. in the presence of a high boiling reaction medium.

2. Process according to claim 1 wherein the aminophenol is an amine corresponding to the formula

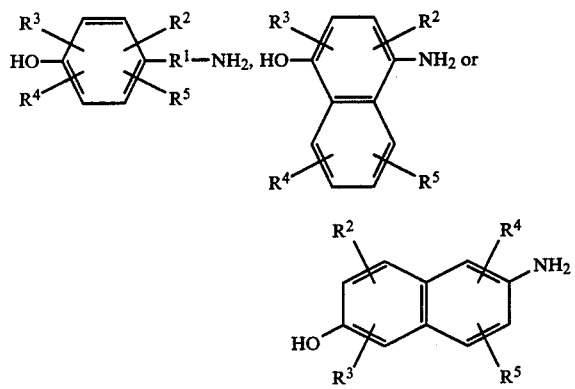

wherein

TABLE 2

Synthesis of poly-N—(4-hydroxyphenyl)-trimellitic acid imide esters from 4-aminophenol(a) and trimellitic acid anhydride by a "one-pot reaction" (Temp. = 350° C., time = 18 h)

| No. | Condensing Agent | Reaction medium | Yield (%) | $\overline{DP}^{(c)}$ | Overall formula (molecular weight) | Calculated | Analysis C 67.95 | H 2.66 | N 5.28 |
|---|---|---|---|---|---|---|---|---|---|
| 1 | acetic anhydride | dimethylformamide Marlotherm-S | 68.0 | 90 | $(C_{15}H_7NO_4)_n$ $(265.2)_n$ | Calc. | 68.8 | 2.95 | 5.20 |
| 2 | acetic anhydride | dioxane Marlotherm-S | 91.0 | 100 | " | " | 69.5 | 3.00 | 5.19 |
| 3 | butyric acid | dioxane Marlotherm-S | 89.0 | 35 | " | " | 68.4 | 2.88 | 5.00 |
| 4 | acetyl chloride | dioxane Marlotherm-S | 90.5 | 70 | " | " | 68.8 | 2.84 | 5.21 |
| 5 | phenyl chloroformate | dioxane Marlotherm-S | 84.0 | — | " | " | 68.9 | 2.97 | 5.00 |
| 6 | diphenyl carbonate | dioxane Marlotherm-S | 87.5 | — | " | " | 69.5 | 3.07 | 4.95 |
| 7 | acetic anhydride(a) | dioxane Marlotherm-S | 42.5 | 110 | $(C_{15}H_5Cl_2NO_4)_n$ $(334.1)_n$ | Calc. found | 53.9 | 1.51 | 4.19 |

(a)2,6-dichloro-4-aminophenol was used in No. 7.
(b)after extraction with acetone and methylene chloride.
(c) $^1$H NMR end group determination; limits of error about ±10

$R^1$ represents a single bond, an arylene with 6 to 10 carbon atoms, or a substituted arylene substituted one to three times with halogen or with alkyl having 1 to 3 carbon atoms, $R^2$, $R^3$, $R^4$ and $R^5$ represent independently hydrogen, alkyl having 1 to 3 carbon atoms or halogen.

3. Process according to claim 2 wherein at least one of $R^2$, $R^3$, $R^4$ or $R^5$ is chloro or bromo.

4. Process according to claim 1 wherein part (b) is carried out in the presence of a comonomer which comprises a hydroxybenzoic acid, a dihydroxy benzene, a dihydroxy biphenyl, a dihydroxy napthalene or a dicarboxylic acid.

* * * * *